May 25, 1948.  E. VAN DER PYL  2,442,153
BAND SAW WITH DIAMOND ABRASIVE TEETH
Filed April 23, 1946
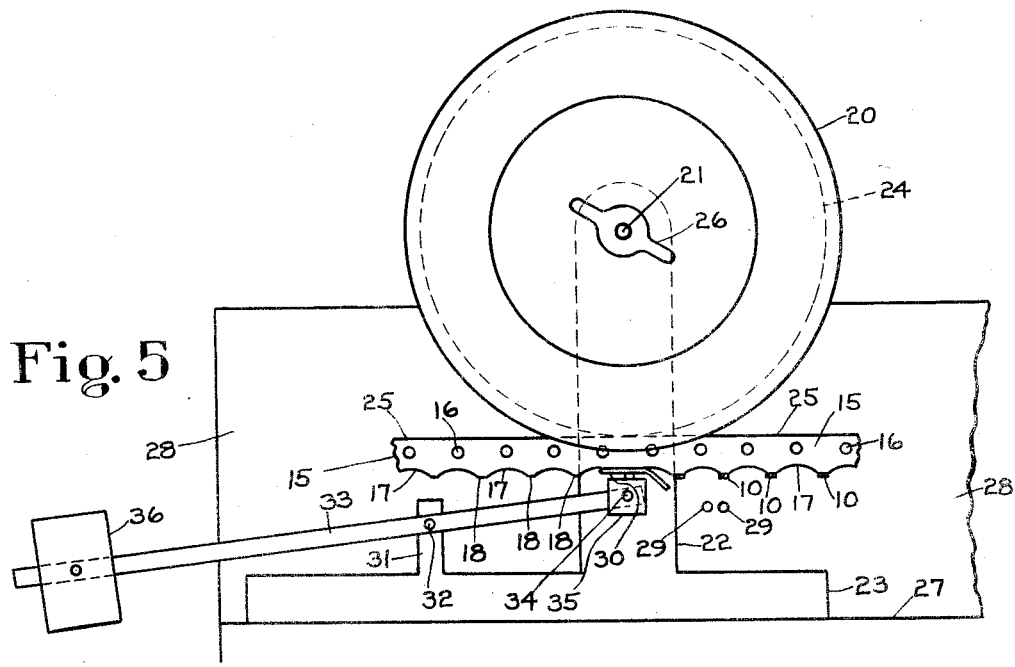
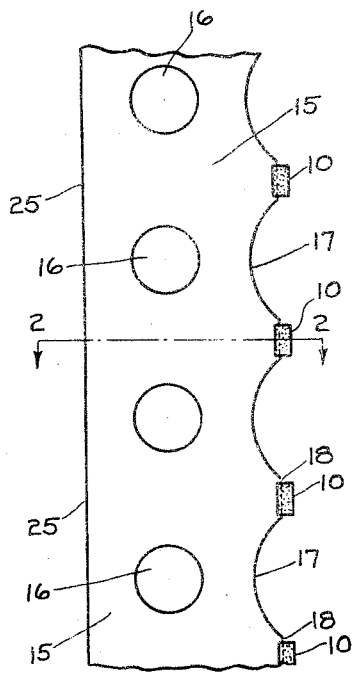
Inventor
EDWARD VAN DER PYL
By Geo. Crompton Jr.
Attorney Patented May 25, 1948

2,442,153

UNITED STATES PATENT OFFICE 2,442,153

BAND SAW WITH DIAMOND ABRASIVE TEETH

Edward Van der Pyl, Holden, Mass., assignor to Norton Company, Worcester, Mass., a corporation of Massachusetts Application April 23, 1946, Serial No. 664,370

4 Claims. (Cl. 125—21)

1

The invention relates to a band saw for cutting very hard materials such as granite, marble and other hard stone.

One object of the invention is to provide a band saw for cutting extremely hard materials. Another object of the invention is to provide a metal band with abrasive teeth which can flex as it passes over a pulley without disturbing the union between the band and the abrasive teeth. Another object of the invention is to make articles of the class indicated cheaply and expeditiously. Another object of the invention is to make a strong, rugged but flexible band saw having diamond abrasive teeth. Another object is to provide a band saw with a high cutting rate, to shorten the time required for cutting stone blocks and the like. Other objects will be in part obvious or in part pointed out hereinafter.

The invention accordingly consists in the features of construction, combinations of elements and arrangements of parts, all as will be illustratively described herein, and the scope of the application of which will be indicated in the following claims.

In the accompanying drawings illustrating one of many possible embodiments of the invention, Figure 1 is an elevation of a fragment of a band saw constructed in accordance with the invention, Figure 2 is a cross sectional view taken on the line 2—2 of Figure 1, Figure 3 is a side elevation, on an enlarged scale, of an abrasive tooth, Figure 4 is an end elevation of an abrasive tooth, on the same scale as Figure 3, Figure 5 is a side elevation of the apparatus for welding or soldering the abrasive teeth onto the band, the loop being broken away to show the nipples of the apparatus.

I provide diamond abrasive consisting of diamonds bonded with a non-ferrous metal bond. Preferably I proceed in accordance with my prior U. S. Patent Reissue No. 21,165, which describes the manufacture of diamond abrasives by mixing a quantity of crushed diamond bort with metal powder, pressing the mixture in a mold to make the desired shape, then sintering at a temperature high enough to form a strong, tough abrasive piece.

One widely used formula for diamond abrasive bodies in accordance with my aforesaid patent consists of 18.6% tin and 81.4% copper, by weight, in separate powders, which produces a tough but friable bond for the diamonds. These proportions may be varied widely. Another example of

2 a successful bond is a mixture of copper, iron, tin and nickel in the proportion of 25% of each by weight in accordance with my Patent No. 2,238,351. Again the proportions may be varied widely. The size and concentration of the particles of crushed diamond may vary, depending upon the particular material to be ground, but as an illustrative example, I may use 25 per cent by volume of diamonds, the remainder metal powders, to form the bond.

Referring now to Figures 3 and 4, in accordance with the foregoing I mold and sinter a large quantity of diamond abrasive pieces 10 which are of generally rectangular parallelopipedal shape having a longitudinal groove 11 with right angles on one side.

Referring to Figures 1 and 2, I provide an endless steel band 15 which can be placed over a pair of pullies, not shown, one or both being driving pullies in order that the band may be driven to cut a piece of granite, marble, or other stone. It is important that the steel band 15 shall be able to flex as it passes over the pullies without breaking the union between the metal bonded abrasive pieces 10 and the band 15. To that end I provide at spaced intervals holes 16 in the steel band 15 which may be of any desired shape although angles are to be avoided since they can set up detail fractures. To the same end I preferably provide curved cut-outs 17 in one edge of the band 15, the central points of which are preferably opposite the centers of the holes 16.

The curved cut-outs 17 leave lands or projections 18 therebetween upon which projections the diamond abrasive pieces 10 are secured in a manner which will now be described. Referring now to Figure 5, a disc wheel 20 is journalled on a threaded stud 21 projecting from a standard 22 uprising from a base 23. The disc wheel 20 has in its periphery a slot 24 which is just wide enough to receive and grip the steel band 15. The back edge 25 of the steel band 15 is inserted in the slot 24 on the under side of the wheel. The foregoing constitutes means for indexing (moving spaced portions of the band to a fixed position) the steel band. The disc wheel 20 is moved by hand and may be locked in any desired position by means of a wing nut 26 on the stud 21.

I provide an induction heating and welding machine which will not be described in detail. Such machines are available on the market and I have obtained satisfactory results with a machine providing 1070 British thermal units per minute, or approximately 20 kilowatts, at a frequency of 375 kilocycles. This machine has a bench 27 and a cabinet 28 extending upwardly from the rear of the bench, and it has threaded nipples 29 which deliver in circuit, both electrical energy of the above power and frequency and also water for cooling. As equipment for such machines there are a number of loops, some open loops and some having a complete turn, of various lengths and shapes, all of them however being copper pipes with coupling nuts for attaching the loops to the nipples 29.

I select an open loop 30 which has a right angle bend, attach it to the nipples 29 and locate the end of the loop 30 under the wheel 20 and spaced from the periphery of the wheel just far enough so that the loop extends around a land or projection 18. The loop can readily be bent downwardly a sufficient distance to index the steel band 15 to bring successive lands 18 within it.

The base 23, which rests upon the bench 27, has another standard 31 upon which is pivotally mounted by means of a stud 32, a lever 33. Pivotally mounted upon the right hand end of the lever 33 by means of a stud 34 is a block 35 made of refractory insulating material. A weight 36 is attached to the left hand end of the lever 33. The weight 36 presses the block 35 upwardly. The grooves 11 of the abrasive pieces 10 are slightly wider (of the order of .010 inch) than the thickness of the back 25 of the steel band 15. I place a flat strip of solder on the bottom of the groove 11 of an abrasive piece 10, place the piece under and surrounding the land 18 which is within the loop 30 and then allow the block 35 to hold the parts together. The power is then turned on and the piece 10 is soldered to the land 18. I then index the wheel 20 and attach another piece 10 to the next land 18. In this way the steel band 15 is equipped with diamond abrasive teeth, one upon each land or projection 18.

When the loop 30 is energized, the land or projection 18 will heat up in a matter of seconds. Actually it will be red hot in about twenty seconds. It is kept at this temperature for merely a few seconds and then the power is turned off. During this operation the solder melts and it not only wets the bottom of the groove 11, but also runs up the sides thereof. Care should be exercised that no metal part shall touch the loop 30 as if it does a hole will be burned in the loop 30.

Although the land 18 inside of the diamond abrasive piece 10 gets red hot, the diamond abrasive piece 10 which is definitely in the high frequency electro-magnetic field does not get red hot and in fact, remains comparatively cool. This is an important feature which enables me to make satisfactory pieces by this welding or soldering or brazing process since were the piece 10 to get red hot during the welding operation it would be ruined as an abrasive. The outer layer of diamonds in the piece 10 would burn if it were red hot.

There are two phenomena involved in induction heating. One is hysteresis and the other is eddy currents. Around every conductor carrying electricity is a magnetic field. If the current is alternating, the magnetic field reverses with the alternation. A reversing magnetic field generates an electromotive force in any conductor located in said field. Such an electromotive force will create eddy currents in a solid block of conducting material. On the other hand, if the material is paramagnetic, in addition to the eddy currents due to the conductivity of the material there is the phenomenon of hysteresis, which constitutes the movement of the molecules of the material as they try to adjust themselves parallel to the magnetic lines of force which in this case change their direction 375,000 times a second.

Furthermore, the heating effect due to the eddy currents is less with high conductivity material such as copper than it is with relatively poor conductors such as iron. For these reasons it is found that the lands 18, being made of steel, can be heated red hot while the diamond abrasive piece 10, which is bonded with a highly conductive, non-magnetic bond, is still relatively cold.

With regard to the solder, any hard solder or brazing material can be used and this includes various brasses and various formulae for silver solder. Merely as an example, I find that a silver solder which consists of 55.82% Ag, 22.10% Cu, 17.19% Zu and 4.90% Sn, all parts by weight, gives very satisfactory results.

The pieces 10 when they are soldered or welded to the steel band 15 are diamond abrasive teeth. It will be seen that the teeth are wider than the band 15 and therefore they do all of the work, and there is no binding of the band in the cut. The band saw is strong and the teeth are metallurgically attached to it so that it can absorb a great deal of power. Nevertheless, it readily flexes around the pulleys due to the holes 16 and the cut-outs 17. Band saws made in accordance with the invention will cut the hardest materials including granite and even harder stone and at a high cutting rate.

A feature of the invention is that the lands 18 are located in grooves 11 of the teeth. This results in a metallurgical union on three faces of the grooves of the teeth and three faces of the steel band 15 so that it is practically impossible to break the union.

It will thus be seen that there has been provided by this invention a band saw in which the various objects hereinbefore set forth together with many thoroughly practical advantages are successfully achieved.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. A band saw comprising a steel band having holes therethrough at spaced intervals and cut-outs along one edge thereof opposite said spaced holes, and a plurality of metal bonded diamond abrasive teeth metallurgically attached to the same edge between the cut-outs.

2. A band saw according to claim 1 in which the teeth are wider than the steel band.

3. A band saw according to claim 1 in which the bond for the abrasive teeth is non-ferrous metal and of greater conductivity than the steel of he band.

4. A band saw comprising a steel band having holes therethrough at spaced intervals and cut-outs along one edge thereof leaving lands therebetween, the cut-outs being opposite the spaced holes, whereby the steel band will flex but not at the lands, and a plurality of grooved non-ferrous metal bonded diamond abrasive teeth the bond of which is more conductive than the steel of the band, said teeth being metallurgically united to the lands on three faces of the lands and in three faces of the grooves forming a strong metallurgical union.

EDWARD VAN DER PYL.

REFERENCES CITED

The following references are of record in the file of this patent:

UNITED STATES PATENTS

| Number | Name | Date |
|---|---|---|
| 608,703 | Murphy | Aug. 9, 1898 |
| 1,137,731 | Ahearn | May 4, 1915 |
| 1,653,265 | Foerster | Dec. 20, 1927 |
| 1,866,356 | Jones | July 5, 1932 |
| 2,137,201 | Boyer | Nov. 15, 1938 |

FOREIGN PATENTS

| Number | Country | Date |
|---|---|---|
| 105,376 | Great Britain | Apr. 10, 1917 |
| 381,229 | Great Britain | Oct. 3, 1932 |